(12) United States Patent
Komarla et al.

(10) Patent No.: US 7,117,396 B2
(45) Date of Patent: Oct. 3, 2006

(54) SCALABLE CPU ERROR RECORDER

(75) Inventors: Eshwari P. Komarla, Olympia, WA (US); Suresh Marisetty, San Jose, CA (US); Mani Ayyar, Cupertino, CA (US); Andrew J. Fish, Olympia, WA (US); Mohan J. Kumar, Aloha, OR (US); Shivnandan D. Kaushik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 10/029,308

(22) Filed: Dec. 28, 2001

(65) Prior Publication Data

US 2003/0126516 A1 Jul. 3, 2003

(51) Int. Cl.
*G06F 11/00* (2006.01)
(52) U.S. Cl. .......................... 714/45; 714/779
(58) Field of Classification Search ................ 714/45, 714/46, 47, 48, 52, 57, 39, 779, 780, 798, 714/49, 56, 37, 38, 20
See application file for complete search history.

(56) References Cited

U.S. PATENT DOCUMENTS

| | | | |
|---|---|---|---|
| 5,483,637 A * | 1/1996 | Winokur et al. ............. 714/26 |
| 5,539,877 A * | 7/1996 | Winokur et al. ............. 714/26 |
| 5,740,357 A * | 4/1998 | Gardiner et al. ............. 714/57 |
| 5,892,898 A * | 4/1999 | Fujii et al. .................... 714/57 |
| 6,061,810 A * | 5/2000 | Potter .......................... 714/23 |
| 6,202,177 B1 | 3/2001 | Fujii ............................ 714/40 |
| 6,230,286 B1 | 5/2001 | Shapiro et al. .............. 714/23 |
| 6,598,179 B1 * | 7/2003 | Chirashnya et al. ......... 714/37 |
| 2002/0073353 A1 * | 6/2002 | Fish et al. ..................... 714/2 |
| 2003/0070115 A1 * | 4/2003 | Nguyen et al. .............. 714/23 |

OTHER PUBLICATIONS

Intel, "Itanium™ Processor Family Error Handling Guide", Document No. 249278-001, Jan. 2001, pp. 1-1-8-7. Please note that the document is dated Jan. 2001, but was not published until Feb. 2001.
Intel, "Itanium™ Processor Family System Abstraction Layer Specification", Document No. 245359-003, Jan. 2001, pp. 1-1-B-12. Please note that the document is dated Jan. 2001, but was not published until Feb. 2001.

* cited by examiner

*Primary Examiner*—Nadeem Iqbal
(74) *Attorney, Agent, or Firm*—Kenyon & Kenyon LLP

(57) ABSTRACT

A firmware-based mechanism for creating, storing and retrieving variable-length records associated with error events occurring in a computer platform. The mechanism responds to error notifications by invoking a firmware-based error-handling module. The error-handling module retrieves processor-specific error information and may also interrogate the other components of the computer platform to determine their error status. Then, according to the nature of the discovered errors, the error-handling module may assemble the retrieved error information and status information into a variable-length error record, which the error-handling module may then store in a memory. On request from a processing agent, the error-handling module may retrieve a previously-stored error record and present it to the requesting agent. Thus, the invention provides a unified and standardized approach to computer error handling at the firmware level.

26 Claims, 3 Drawing Sheets

100

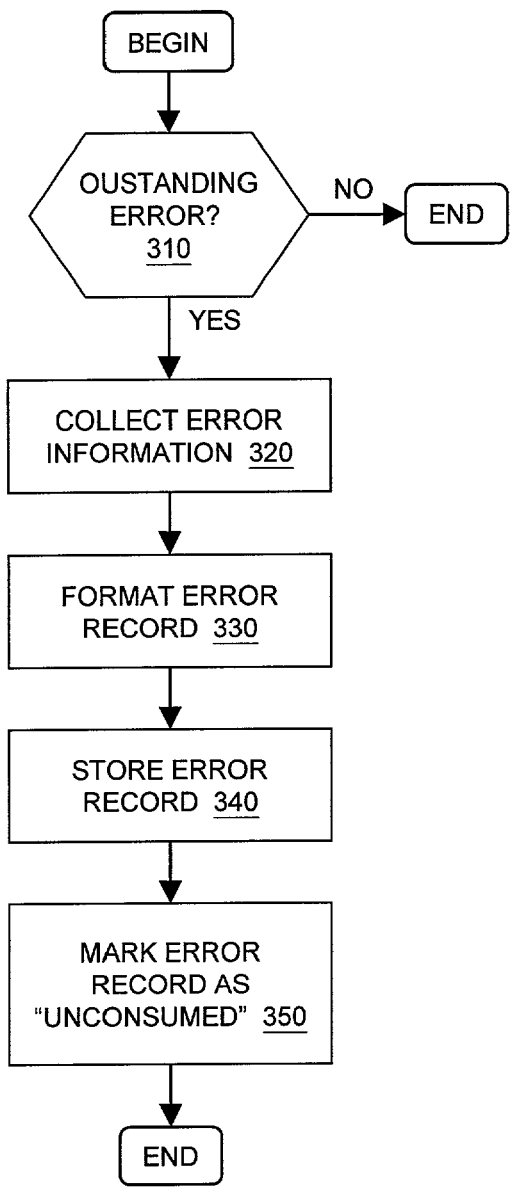
FIG. 3
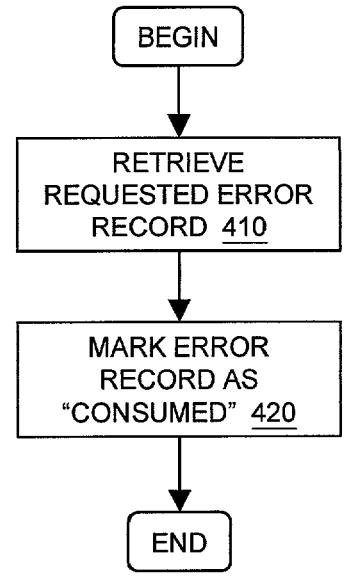
FIG. 4
FIG. 5

US 7,117,396 B2

SCALABLE CPU ERROR RECORDER

BACKGROUND OF THE INVENTION

This invention relates to computer error handling. More specifically, the invention relates to a firmware-based error handling mechanism to support the creation, storage and retrieval of customized and extendible error records in computer platforms.

Modern computers are designed to monitor their own performance and frequently to test themselves to assure that operations have been performed properly. When a fault occurs, a machine interrupt typically is issued, and the hardware and software attempt to locate and identify the error. Depending on the severity of the error, control programs may shut down the entire machine, may avoid use of the faulty component, or may simply record the fact that an error has occurred.

System error detection, containment and recovery are critical elements of highly reliable and fault tolerant computing environments. While error detection is primarily accomplished through hardware mechanisms, system software plays a greater role in the containment and recovery of errors. The degree to which overall error handling is effective in maintaining system integrity depends upon the level of coordination and cooperation between the system CPUs, platform hardware fabric, and system software. Vendors of such computer systems therefore have developed maintenance and diagnostic facilities as part of their computer platforms. When a system failure occurs, diagnostic software may attempt to determine the cause of the failure and may also attempt to store information describing the failure, so that subsequent efforts to resolve or eliminate the failure may benefit from the stored information.

In the prior art, software-based error handling mechanisms of the type described have traditionally resided in a portion of the computer operating system. As a result, operating system designers have been required to develop unique error handling subsystems for each supported computer platform. Because of this constraint, computer error handling capabilities have been relatively limited in the prior art. In particular, designers of multiple computing environments have been forced to isolate the error management functions of each component operating system. Similarly, designers of complex computer platforms having multiple domains and/or partitions have been forced to deploy separate and isolated error management systems. Additionally, Original Equipment Manufacturers (OEMs) have been restricted in their ability to develop customized computer platforms that provide enhanced maintenance capabilities.

Accordingly, there is a need in the art for a unified and standardized approach to computer error handling at the firmware level, outside the traditional sphere of an operating system. Such an error handling mechanism would allow computer platform designers and operating system engineers to develop standard error management subsystems that make effective use of common interfaces and methods. A standard error handling mechanism would also permit OEMs to develop error parsers, utilities and enhanced maintenance diagnostics that do not depend on the specific features any particular operating system.

BRIEF DESCRIPTION OF THE DRAWINGS

FIG. 3 is a flow diagram illustrating the error handling control logic according to an embodiment of the present invention.

FIG. 4 is a flow diagram illustrating the error record retrieval control logic in accordance with an embodiment of the present invention.

FIG. 5 is a table illustrating a method employed by an embodiment of the present invention to maintain the consumed/unconsumed status of error records.

DETAILED DESCRIPTION

Embodiments of the present invention provide a firmware mechanism for creating, storing and retrieving variable-length records associated with error events occurring in a computer platform. According to an embodiment, the mechanism responds to error notifications by invoking a firmware-based error-handling module. This error-handling module may retrieve processor-specific error information and also may interrogate other components of the computer platform to determine their error status. Then, according to the nature of the discovered errors, the error-handling module may assemble the retrieved error information and status information into a variable-length error record which the error-handling module may then store in a memory. Upon request from an external processing agent, the error-handling module may retrieve a previously-stored error record and present it to the requesting agent.

Figure 1:
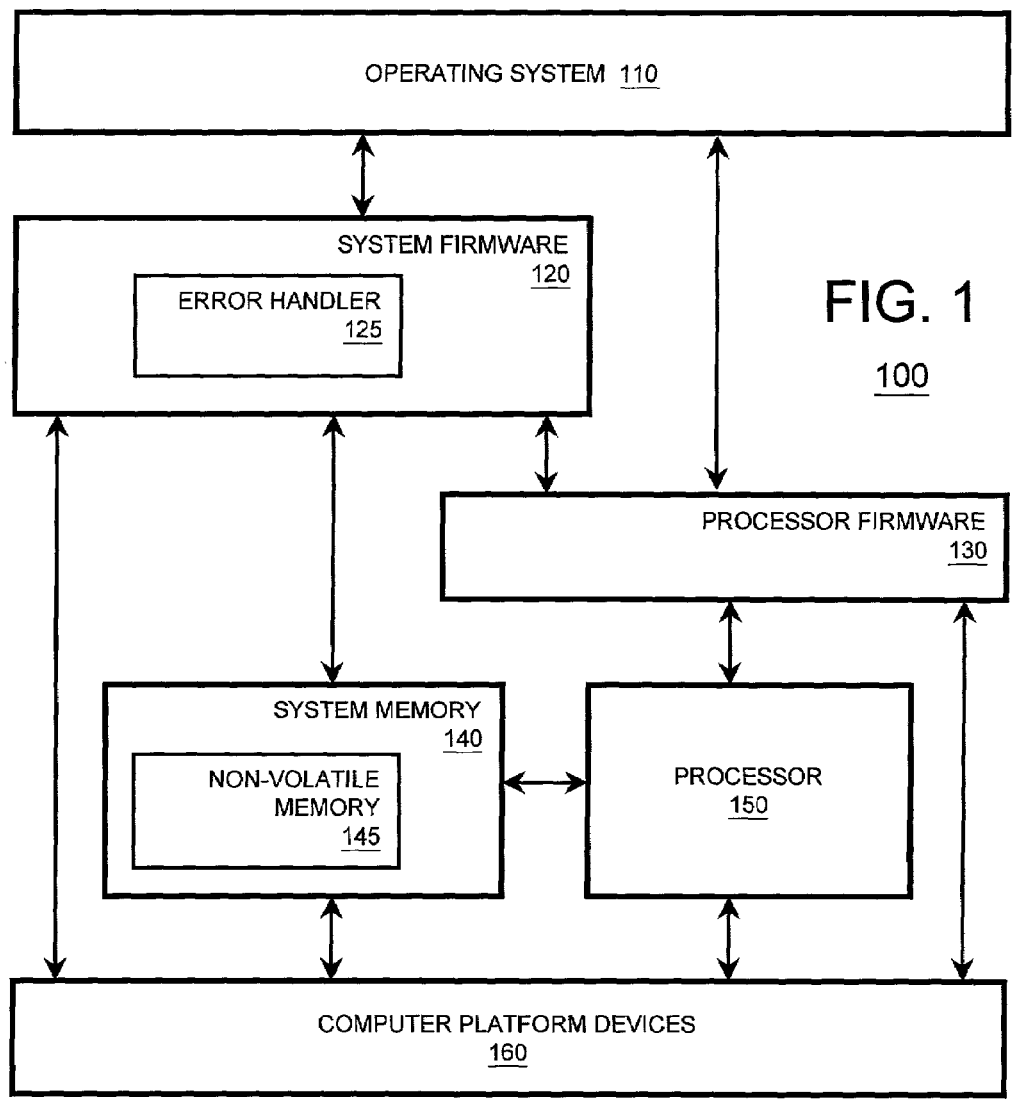
FIG. 1 is an abstract functional block diagram of a computer system incorporating a scalable error logging mechanism in accordance with an embodiment of the present invention.

Referring now in detail to the drawings, wherein like parts are designated by like reference numerals throughout, there is illustrated in FIG. 1 an abstract functional block diagram of a computer system 100 incorporating a scalable error logging mechanism in accordance with an embodiment of the present invention. The computer system 100 may exist in isolation, or it may be one component of a partitioned, multi-processor system. The functional elements of the computer system 100 may include an operating system 110 that accesses computer resources via system firmware 120 and processor firmware 130. As is known in the art, firmware corresponds to computer instructions that are stored in non-volatile memory, i.e., memory that holds its contents in the absence of external power. Traditionally, computer designers provide firmware to perform various low-level tasks that are basic to the operation of a computer system or which exhibit a critical nature. Firmware also may be provided in several layers of abstraction that are equivalent to different levels of responsibility or priority. In addition to being readily available for execution by a processor, firmware may also be protected from inadvertent corruption if it is stored in read-only memory.

In FIG. 1, two levels of firmware are shown. Processor firmware 130 may provide functionality associated with processor management (e.g., saving and restoring processor states), while system firmware 120 may provide broader capabilities relating to platform management and resource management (e.g., device error handling and multi-processor coordination). System firmware 120 may also supply platform-specific versions of common operating system functions. Thus, because system firmware 120 may reside at a higher level of abstraction, it may access processor firmware 130, system memory 140, and computer platform devices 160 (which include peripheral devices). To manage errors occurring at the platform level, system firmware 120 may incorporate an error handler 125 that manages error processing at a level of abstraction above the processor 150, but below the level of operating system 110. Processor 150 is the traditional processing unit of the computer system. Processor 150 may communicate with processor firmware 130 as well as with system memory 140 and computer platform devices 160, in order to execute the primary operations of the computer system. System memory 140 includes the working random-access memory (RAM) of the computer system as well as non-volatile memory 145, which together hold instructions and data used by processor 150 and computer platform devices 160.

Continuing to refer to FIG. 1, a computer system error may arise from one of the computer platform devices 160, from the processor 150, or from the processor firmware 130. When a computer system error occurs, error handler 125 may be invoked. Error handler 125 may comprise a collection of computer instructions that when executed, cause error events to be discovered and recorded for later analysis. Error handler 125 may also comprise computer instructions that attempt to resolve and/or correct an outstanding error to allow a computer system to continue processing. Invocation of error handler 125 may take place indirectly as a result of an interrupt (either a hardware interrupt or a software interrupt), or the error handler may be invoked directly by the operating system 110 through a polling mechanism. Upon invocation, the error handler 125 may extract device-level error information by reading the various hardware registers of the computer platform devices 160 which are within the scope of the processor 150. Alternatively, the processor firmware 130 may extract the device-level error information from the computer platform devices 160 and may then present the collected error information to the error handler 125. Once all the device-level error information has been collected, the error handler 125 may format the collected error information into a variable-length error record which is then stored in system memory. According to an embodiment, error records are stored in non-volatile memory 145 to preserve the error information in the event that the computer is restarted or shut down before the error information could be stored elsewhere.

Figure 2:
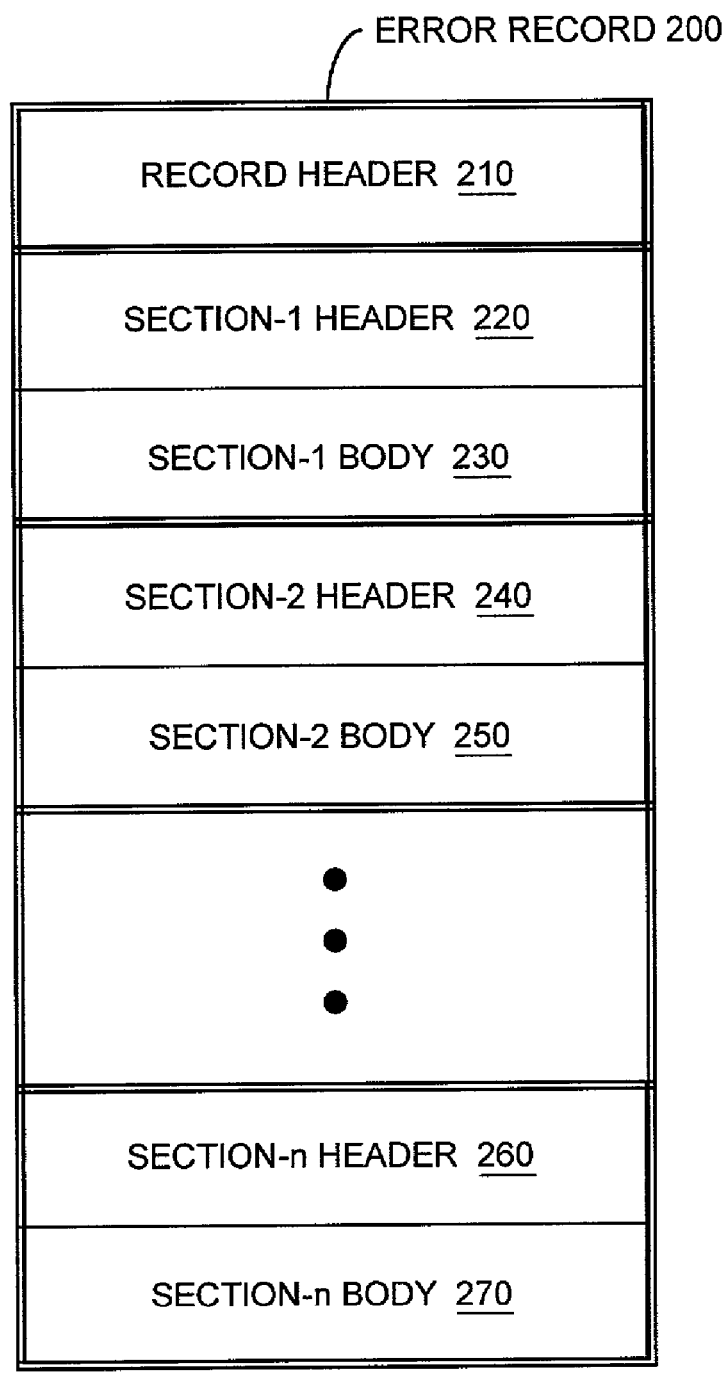
FIG. 2 is a diagram of the variable-length error record data structure employed by an embodiment of the present invention.

FIG. 2 is a diagram of the variable-length error record data structure employed by the error handler 125 (FIG. 1) according an embodiment of the present invention. Each error record 200 captures error information for a single error event. However, because there may be multiple device errors associated with a single error event, the error record 200 includes a variable number of sections, each of which may store error information pertaining to a particular error device. An error record 200 may consist of a generic record header 210 followed by a list of sections containing actual error information for the error event, each section containing information relating to a particular device (for example, a processor, platform memory, a platform bus, etc.) that may have contributed to the error condition. Each section of error record 200 may have two parts: a section header and a section body. Thus, with reference to FIG. 2, the first section may have a section-1 header 220 and a section-1 body 230; the second section (if present), may have a section-2 header 240 and a section-2 body 250; and the last section (if present) may have a section-n header 260 and a section-n body 270. The overall size of an error record 200 is indicated by a record length field, which is an element of record header 210. The record length field may be dynamically set by the error handler 125 (FIG. 1) based on the total size of all the section headers and section bodies combined.

According to an embodiment, the format of the record header 210 may include the following fields:

| Field | Length | Description |
| --- | --- | --- |
| RECORD_ID | 8 bytes | Unique monotonically increasing identifier. |
| REVISION | 2 bytes | Major and minor revision number of the error record in BCD format. Byte 0 - Minor number Byte 1 - Major number |
| ERR_SEVERITY | 1 byte | 0 - Recoverable 1 - Fatal 2 - Corrected |
| VALIDATION_BITS | 1 byte | If Bit 0 = 1, the OEM_PLATFORM_ID field contains valid information. |
| RECORD_LEN | 4 bytes | Length of the record in bytes, including the header. |
| TIME_STAMP | 8 bytes | Time od the error. Byte 0 - seconds Byte 1 - minutes Byte 2 - hours Byte 3 - reserved Byte 4 - day Byte 5 - month Byte 6 - year Byte 7 - century |
| OEM_PLATFORM_ID | 16 bytes | Unique identifier of the OEM platform. |

Still referring to FIG. 2, a series of device-specific sections may follow record header 210. Each section may have a section header and a section body. The format of a section body may depend on its corresponding device and thus is peculiar to specific implementations. However, the section header may be standardized. According to an embodiment, the format of the section header may include the following fields:

| Field | Length | Description |
| --- | --- | --- |
| GUID | 16 bytes | Global Unique Identifier corresponding to the specific device. |
| REVISION | 2 bytes | Major and minor revision number of the section in BCD format. Byte 0 - Minor number Byte 1 - Major number |
| ERROR_RECOVERY_INFO | 1 byte | If Bit 7 = 1, remaining bits contain information about the error. Bit 6–3 = Reserved (must be zero). Bit 2 = Reset. If set, the component must be reinitializeded or re-enabled by the operating system prior to use. Bit 1 = Containment Warning. If set, the error was not contained within the proscessor or memory hierarchy and the error may have propagated to persistent storage or to a network. If Bit 0 is set, the error has been corrected. |

-continued

| Field | Length | Description |
|---|---|---|
| RESERVED | 1 byte | Reserved. |
| SECTION_LEN | 4 bytes | Length of the error section in bytes, including the device header. |

An error record 200 may be stored in system memory 140 (FIG. 1) or in non-volatile memory 145 (FIG. 1). The error record 200 storage and indexing scheme may employ simple tables containing pointers to the error records 200, linked lists of pointers to the error records 200, or other methods known in the art for storing, searching and retrieving variable-length data structures.

FIG. 3 is a flow diagram illustrating operation of the error handling control logic according to an embodiment of the present invention. The operation may begin when one of the computer platform devices 160 (FIG. 1) generates a hardware or software interrupt corresponding to an error condition. Alternatively, the operation may begin when the operating system 110 (FIG. 1) invokes the error handler 125 (FIG. 1) through a polling mechanism. If there is an outstanding error condition (310), the error handler may then collect error information (320) by querying the various registers of the computer platform devices 160 (FIG. 1). According to alternate embodiment, the processor firmware 130 (FIG. 1) may extract some or all of the device-level error information from the computer platform devices 160 and may then present the collected error information to the error handler 125. Once all of the error information has been collected (320), the error handler may format the information into an error record (330) and then store the error record in system memory (340). If stored error records are intended to be accessed following a computer system re-boot or restart, the error handler may store error records in non-volatile memory. Finally, after the error record has been stored in memory, the error handler may mark the error record as unconsumed (350) until the error record is retrieved by the operating system or by some other error management capability.

FIG. 4 is a flow diagram illustrating the error record retrieval control logic in accordance with an embodiment of the present invention. The operation may begin when the operating system 110 (FIG. 1) or other error management capability invokes the error handler 125 (FIG. 1) to retrieve an error record. An error record may be retrieved by its identifier or it may be retrieved according to an ordering scheme such as first-in-first-out (FIFO) or last-in-first-out (LIFO). When requested, the error handler may retrieve the appropriate error record (410) and may provide the error record to the requesting agent. The error handler may then mark the error record as consumed (420), so that the memory associated with the consumed error record may be reused at a later time. After an error record has been marked as consumed, the error handler may then perform a garbage collection algorithm to collect and combine the memory associated with consumed error records. Garbage collection algorithms are well-known in the art.

FIG. 5 is a table illustrating a method employed by an embodiment of the present invention to maintain the consumed/unconsumed status of error records. The error handler 125 (FIG. 1) may construct a consumed record table 500, which contains information corresponding to each error record. For each error record in the table, the error handler may maintain an ID Number 510 and a Consumed indicator 520. When the error handler stores a new error record (see FIG. 3, item 340), the error handler may simultaneously create a new entry in the consumed record table 500 and may indicate that the record has not been consumed. At a later time, when the error handler is requested to retrieve an error record (see FIG. 4, item 410), the error handler may locate the error record in the consumed record table 500 and may mark the error record as consumed.

According to one embodiment, the present invention provides a firmware-based mechanism for creating, storing and retrieving variable-length records associated with error events occurring in a single-processor computing system. According to another embodiment, the present invention may also operate in a multi-processor environment in which processors are partitioned into domains, each having dedicated computer platform devices. In such a multi-processor environment, an instance of the present invention may exist and operate within the domain of each individual processor. Upon receiving an error notification, an instance of this embodiment may interrogate the components of the computer platform lying within the scope of the embodiment's processor domain to discover the outstanding error events and construct an appropriate error record.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method, comprising:
   invoking a firmware error handler in response to a notification of a computer error;
   gathering information within the firmware error handler about a plurality of error events;
   formatting the gathered information as an error record, said error record including a record header delineating the beginning of the error record, and a variable number of sections, each section having a section header and a variable-length section body, wherein each section corresponds to one of the plurality of error events; and
   storing the error record in a non-volatile storage medium.

2. The method of claim 1, wherein the record header includes:
   a monotonically increasing record identifier;
   a revision number;
   an error severity value;
   a time stamp; and
   a record length.

3. The method of claim 1, wherein the section header includes:
   a global unique identifier corresponding to a specific device; and
   a section length field containing the length of the section.

4. A machine-readable medium having stored thereon executable instructions that when executed by a processor, cause the processor to:
   receive notification of an error;
   invoke a firmware error handler in response to the notification;
   gather information about a plurality of outstanding error events;
   format the gathered information as a variable-length error record, said variable-length error record having a format including a record header delineating the beginning of the error record, and a variable number of sections, each section having a section header and a variable-length section body, wherein each section corresponds to one of the plurality of error events;
store the error record in a memory; and
when requested, output the error record to an agent.

5. A method, comprising:
receiving an indication of an error condition within a computer system;
invoking a firmware error handler within the computer system;
collecting a plurality of device error states, each device error state including information describing the current operational condition of a peripheral device within the addressing range of a processor executing in the computer system;
assembling, within the firmware error handler, said plurality of device error states into a variable-length error record associated with the error condition, said variable-length error record having a format including a record header delineating the beginning of the error record, and a variable number of sections, each section corresponding to one of the plurality of device error states; and
storing the variable-length error record in a non-volatile memory.

6. The method of claim 5, further comprising:
outputting the variable-length error record to an external agent, and
freeing for reuse the memory associated with the variable-length error record.

7. The method of claim 5, wherein the record header includes:
a record identifier; and
a record length.

8. The method of claim 5, wherein the record header includes:
a severity value associated with the error condition; and
a time stamp associated with the error condition.

9. The method of claim 5, wherein the record header includes:
a platform identifier associated with the computer system.

10. The method of claim 5, wherein each section includes:
a unique identifier corresponding to the peripheral device associated with the section.

11. The method of claim 10, wherein each section further includes error recovery information for the peripheral device associated with the section.

12. The machine-readable medium of claim 4, wherein the executable instructions stored thereon when executed by the processor further cause the processor to free for reuse the memory associated with the variable-length error record.

13. A computer system, comprising:
a non-volatile memory in communication with a bus; and
error handling control logic coupled to the bus, said error handling control logic to receive an indication of an error condition for a device within the computer system,
said error handling control logic to collect a plurality of device error states, each device error state including information describing the current operational condition of a device within the addressing range of the computer processor, to assemble said plurality of device error states into a variable-length error record associated with the error condition, said variable-length error record having a format including a record header delineating the beginning of the error record, and a variable number of sections, each section corresponding to one of the plurality of device error states, and to store the variable-length error record in the non-volatile memory.

14. The computer system of claim 12 wherein the processor is to
output the variable-length error record to an external agent, and
free for reuse the memory associated with the variable-length error record.

15. The computer system of claim 12 wherein the record header includes:
a record identifier; and
a record length.

16. The computer system of claim 12 wherein the record header includes:
a severity value associated with the error condition; and
a time stamp associated with the error condition.

17. The computer system of claim 12 wherein the record header includes:
a platform identifier associated with the computer system.

18. The computer system of claim 12 wherein each section includes:
a unique identifier corresponding to the device associated with the section.

19. The computer system of claim 18, wherein each section further includes error recovery information for the device associated with the section.

20. An error logging apparatus, comprising:
a non-volatile memory coupled to a bus, and
control logic to gather a plurality of device error states, each device error state including information describing the operational state of a device interoperably connected to the bus;
said control logic to format the gathered device error states as a variable-length error record, said variable-length error record having a format including a record header delineating the beginning of the error record, and a variable number of sections, each section having a section header and a variable-length section body, wherein each section corresponds to one of the plurality of error events; and to store the error record in a memory; and if requested, to output the error record to an agent.

21. The error logging apparatus of claim 20 wherein said control logic is to free for reuse the memory associated with the variable-length error record.

22. The error logging apparatus of claim 20 wherein the record header includes:
a record identifier; and
a record length.

23. The error logging apparatus of claim 20 wherein the record header includes:
a severity value associated with the error condition; and
a time stamp associated with the error condition.

24. The error logging apparatus of claim 20 wherein the record header includes:
a platform identifier associated with the error logging apparatus.

25. The error logging apparatus of claim 20 wherein each section includes:
a unique identifier corresponding to the device associated with the section.

26. The error logging apparatus of claim 25, wherein each section further includes error recovery information for the device associated with the section.

* * * * *